(12) United States Patent
Bozic et al.

(10) Patent No.: US 6,557,589 B2
(45) Date of Patent: May 6, 2003

(54) HOSE BENDING CLAMP

(76) Inventors: Dennis Bozic, 113 The Avenue, Warnbro WA 6169 (AU); Frank Dobra, 12 Owen Rd., Safety Bay WA 6169 (AU)

(*) Notice: Subject to any disclaimer, the term of this patent is extended or adjusted under 35 U.S.C. 154(b) by 4 days.

(21) Appl. No.: 09/811,821

(22) Filed: Mar. 20, 2001

(65) Prior Publication Data

US 2001/0034924 A1 Nov. 1, 2001

(30) Foreign Application Priority Data

Mar. 20, 2000 (AU) .............................................. PQ6324
Mar. 24, 2000 (AU) .............................................. PQ6436

(51) Int. Cl.[7] .................................................. F16L 3/00
(52) U.S. Cl. ........................ 138/106; 138/110; 138/177; 138/DIG. 8
(58) Field of Search ................................ 138/106, 110, 138/177, DIG. 8

(56) References Cited

U.S. PATENT DOCUMENTS

| 1,668,953 A | * | 5/1928 | Erickson | 138/106 |
|---|---|---|---|---|
| 1,694,430 A | * | 12/1928 | Root | 138/141 |
| 2,172,130 A | * | 9/1939 | Powell | 138/110 |
| 2,185,741 A | * | 1/1940 | Sorg et al. | 138/110 |
| 2,748,804 A | * | 6/1956 | Guarnaschelli | 138/110 |
| 2,769,999 A | * | 11/1956 | Sheahan | 138/110 |
| 4,001,918 A | * | 1/1977 | Moore | 138/110 |
| 4,456,034 A | * | 6/1984 | Bixby | 138/122 |
| 5,082,027 A | * | 1/1992 | Stanley | 138/113 |
| 5,449,021 A | * | 9/1995 | Chikama | 138/118 |
| 5,996,640 A | * | 12/1999 | Tseng | 138/119 |
| 6,354,937 B1 | * | 3/2002 | Crook | 138/106 |

* cited by examiner

*Primary Examiner*—James Hook
(74) *Attorney, Agent, or Firm*—Larson & Taylor, PLC (57) ABSTRACT

A hose bending clamp (10) is described for holding a hose in a desired bent shape. The clamp (10) includes a coil 14 designed to slop over the outside over a section of hose to be bent. Each of the turns (12) of the coil are designed to constrain the hose so as to inhibit it from spreading or kinking as it is forced into the desired shape. A malleable spine (16) is provided in connection with the coil (14) and is designed to bend with the hose into the desired shape and to hold the shape when released.

11 Claims, 8 Drawing Sheets

FIG. 1.

HOSE BENDING CLAMP

FIELD OF THE INVENTION

The present invention relates to a clamp for maintaining the bend in a hose to a desired shape and relates particularly, but not exclusively, to a hose bending clamp used in connection with motor vehicle engine hoses.

BACKGROUND TO THE INVENTION

Motor vehicle engines typically have a plurality of rubber hoses provided in connection therewith for transporting fluids to/from the engine and associated components. For example, in a water cooled engine rubber hoses are provided to allow the liquid coolant to circulate within the cooling system between the radiator and the engine. Other hoses may be used in connection with the motor vehicle's air conditioning system. In view of the limited space provided within the engine compartment, it is essential that the hoses are located and configured so as to fit within the spaces between the various engine components. For this purpose, radiator hoses are frequently provided preformed into a desired shape adapted to fit within the confines of the engine compartment and connected to the respective inlets and outlets. However, because such hoses need to be specially designed and treated to achieve and maintain the desired shape it adds to the overall cost of such replacement parts. Because such components are effectively custom made for a particular make and model of motor vehicle engine, there is a limited market for this type of hose.

On the other hand, if such hoses are sold in straight lengths, to be bent into the desired shape by the end user, there is a risk that the hose will spread or kink at the point of bending, thus inhibiting the free flow of fluid through the hose at that point.

SUMMARY OF THE INVENTION

The present invention was developed with a view to providing a hose bending clamp for holding a hose in a desired bent shape and that inhibits the hose from spreading or kinking as it is forced into the desired shape.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to the present invention there is provided a hose bending clamp for holding a hose in a desired bent shape, the clamp comprising:

a plurality of substantially circular constraining means configured to form an elongate generally cylindrical arrangement adapted to slide over the outside of a section of hose to be bent; and a malleable, elongate spine provided in connection with said constraining means and extending longitudinally of said cylindrical arrangement, wherein said spine can be bent into a shape desired for the section of hose and will hold said shape when released whereby, in use, as the spine is bent with the section of hose contained within said cylindrical arrangement, each of said constraining means embrace the hose and substantially prevent the hose from spreading or kinking as it is forced into the desired shape.

In one embodiment, said plurality of substantially circular constraining means are formed by a wire shaped into a coil. Preferably, said coil is formed with a plurality of turns in close proximity at each end to form respective end sections of said cylindrical arrangement. Preferably, each end section is formed with a ridge adapted to receive the respective ends of said spine in connection therewith. Typically, said spine is formed from a rectangular strip of metal, each end of the rectangular strip being received under the ridge of said respective end section and bent back over the ridge so as to be joined to each end of the coil to form a unit.

In an alternative embodiment, said plurality of substantially circular constraining means are formed by a plurality of separate circular ribs positioned at spaced intervals along said spine to form said generally cylindrical arrangement. Preferably, each of said circular ribs are fixed to said spine at said spaced intervals. Alternatively, each of said circular ribs is formed integral with said spine.

BRIEF DESCRIPTION OF THE DRAWINGS

In order to facilitate a more comprehensive understanding of the nature of the invention, preferred embodiments of a hose bending clamp according to the invention will now be described in detail, by way of example only, with reference to the accompanying drawings, in which.

DETAILED DESCRIPTION OF PREFERRED EMBODIMENTS

A first embodiment of a hose bending clamp 10 for holding a hose in a desired bent shape is illustrated in FIGS. 1 to 7. The clamp 10 comprises a plurality of substantially circular constraining means 12 configured to form an elongate, generally cylindrical arrangement 14 (see FIG. 5) adapted to slide over the outside of a section of hose (not illustrated) to be bent. In the first embodiment, the plurality of substantially circular constraining means 12 are formed by turns of a wire shaped into a coil, not unlike a spring in appearance. The inside diameter of the coil is slightly larger than the outside diameter of the hose, with a tolerance of approximately 1 mm so as to allow the coil to slide neatly over the hose in its straightened condition.

Figure 1:
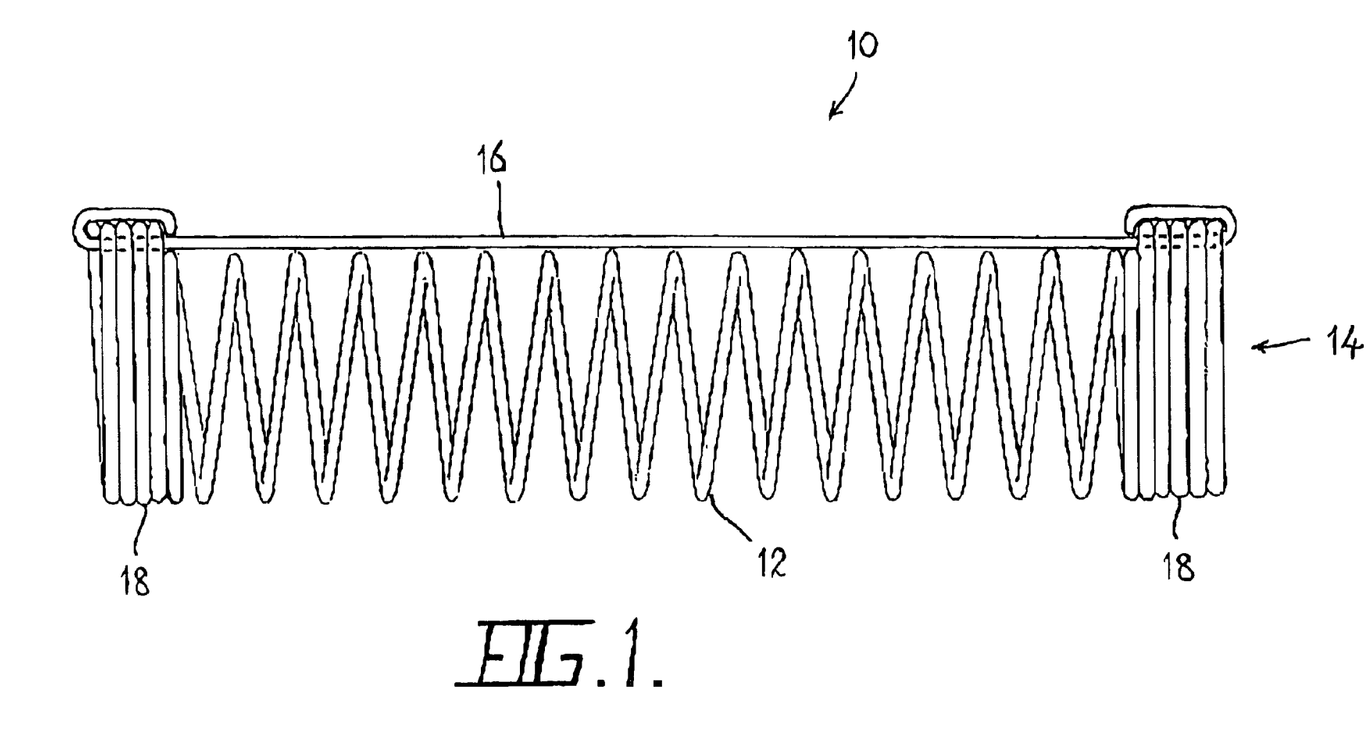
FIG. 1 illustrates in side view a first embodiment of a hose bending clamp in accordance with the present invention.

The hose bending clamp 10 further comprises a malleable, elongate spine 16 provided in connection with the coil 14 and extending longitudinally of the coil. In this embodiment, the spine is formed from a rectangular strip 16 of malleable metal, (see FIG. 7) that can be bent into a shape desired for the section of hose and that will hold the shape when released. The coil 14 is formed with a plurality of turns in close proximity at each end to form respective end sections 18 of the cylindrical arrangement. Preferably, each end section 18 is formed with a ridge 20, as can be seen most clearly in FIG. 6, adapted to receive the respective ends of the spine 16 in connection therewith. Each end of the rectangular strip 16 is received under the ridge 20 of the respective end section 18 and bent back over the ridge as can be seen most clearly in FIG. 1, so as to be joined to each end of the coil 14 to form a unit. Because the ridges 20 are raised above the outside diameter of the coil 14, the metal strip 16 of the spine can pass along the outside of the coil as shown in FIG. 1.

Figure 2:
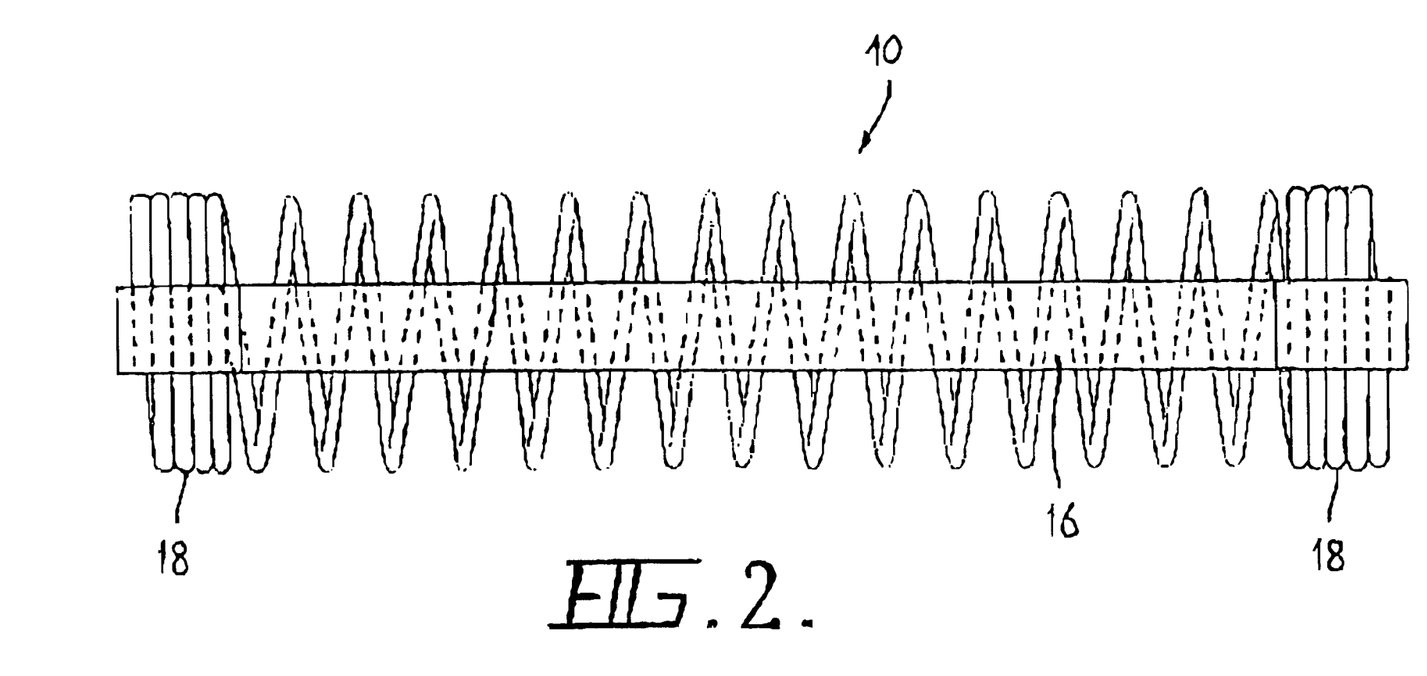
FIG. 2 illustrates in top view the hose bending clamp of FIG. 1.
Figures 3, 4:
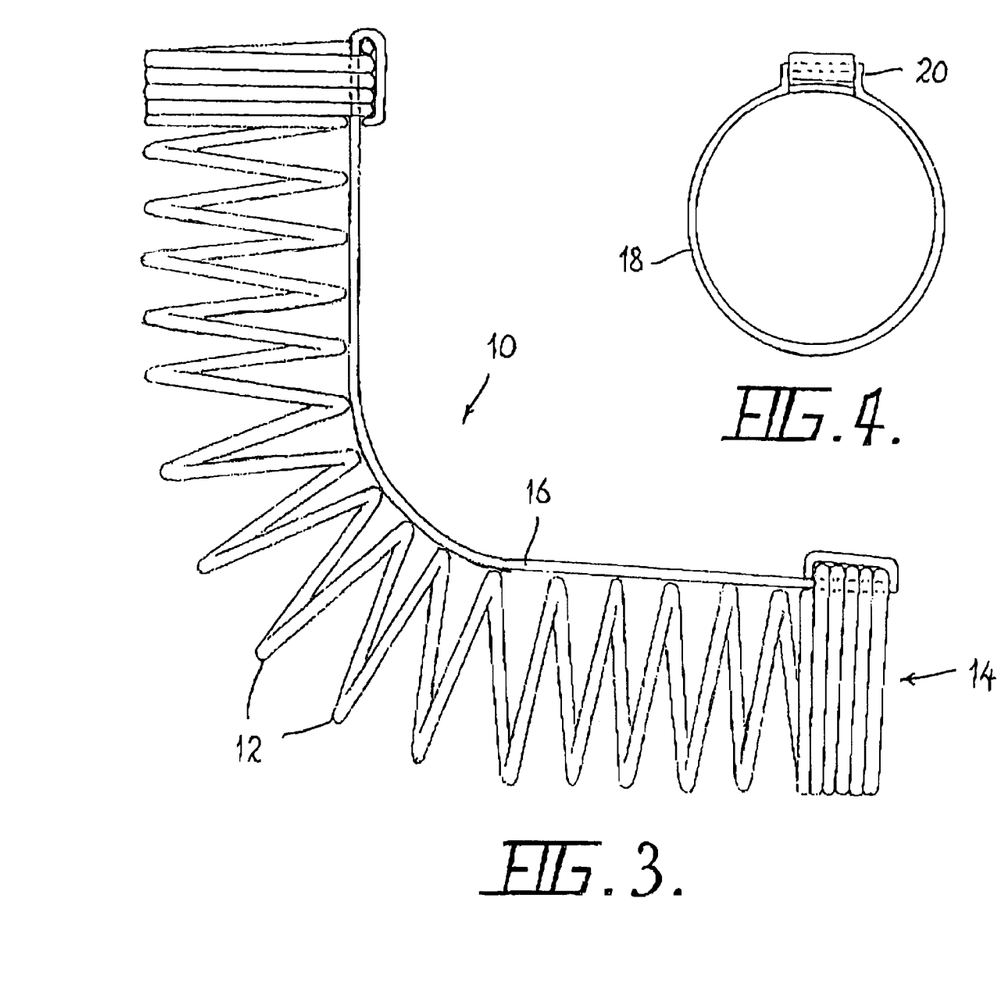
FIG. 3 illustrates the hose bending clamp of FIG. 1 bent into a desired shape.
FIG. 4 illustrates in end view the hose bending clamp of FIG. 1.
Figures 5, 7:
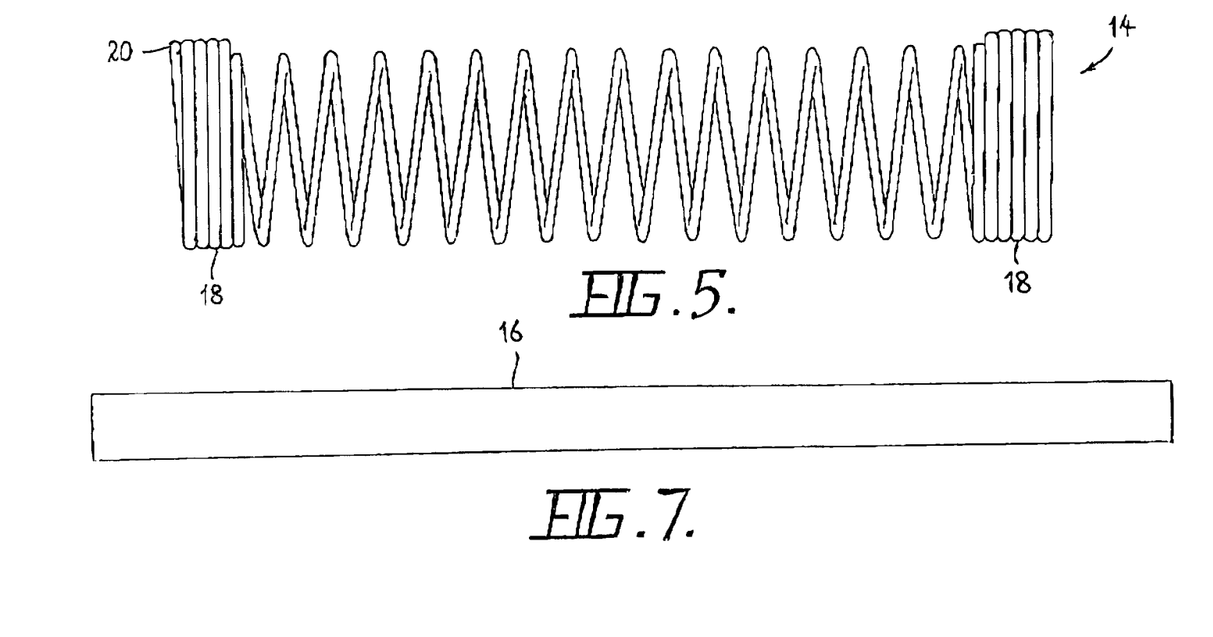
FIG. 5 illustrates a coil component of the hose bending clamp of FIG. 1.
FIG. 7 illustrates a spine component of the hose bending clamp of FIG. 1.
Figure 6:
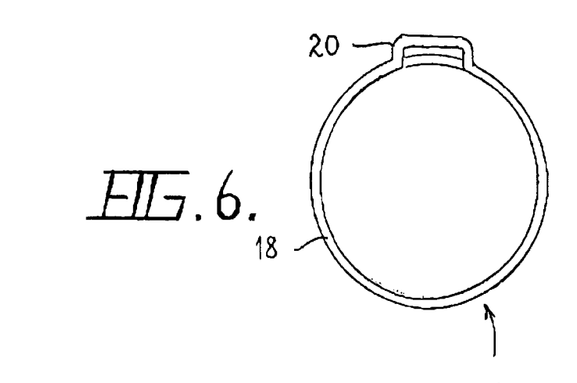
FIG. 6 illustrates the coil component of FIG. 5 in end view.

In use, as the spine 16 is bent with the section of hose contained within the cylindrical arrangement of coil 14, each of the turns 12 of the coil embrace the hose and substantially prevent or constrain the hose from spreading or kinking as it is forced into the desired shape. FIG. 3 illustrates the hose bending clamp bent into a substantially right angle shape. As can be seen in FIG. 3, each of the turns 12 of the coil 14 substantially maintains its internal diameter and therefore acts to constrain the walls of the hose contained therein from bulging, spreading or kinking at the bend. Once the hose with the clamp provided thereon is bent to the desired shape, the spine 14 acts to maintain the shape when the hose is released. Advantageously, the metal of the spine 14 is sufficiently pliable to permit bending by hand but also sufficiently malleable to prevent the spine from returning to its original shape when released or from fracturing. A suitable metal material for the spine 16 is stainless steel (304 grade). The assembled unit as illustrated in FIGS. 1 to 3 can be slid over the hose and, by applying pressure with the fingers around the coil 14 and the thumbs against the spine 16, the unit can be bent with the hose contained therein to the desired angle.

Figures 8, 10:
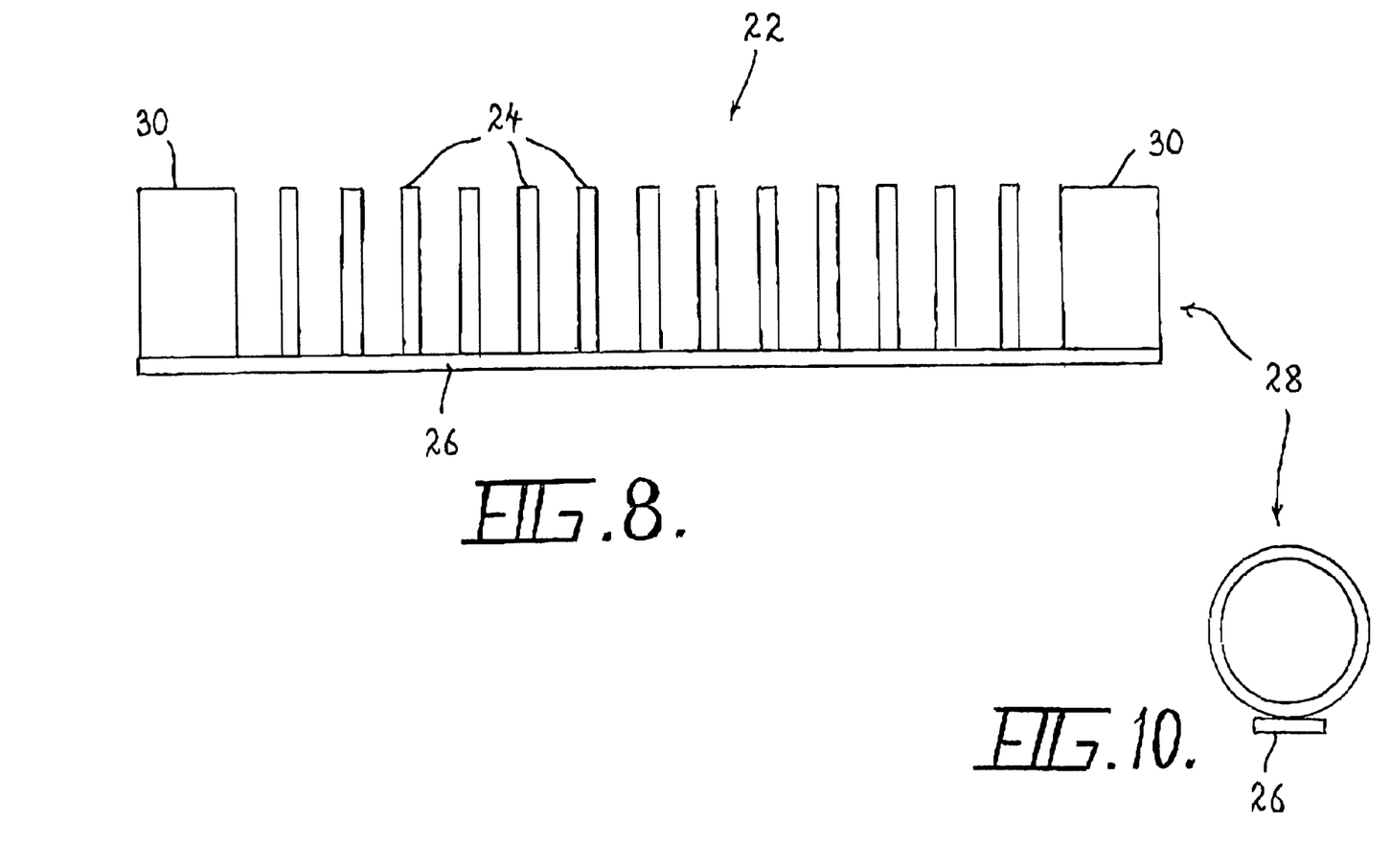
FIG. 8 illustrates in side view a second embodiment of a hose bending clamp in accordance with the present invention.
FIG. 10 illustrates in end view the hose bending clamp of FIG. 8.
Figure 9:
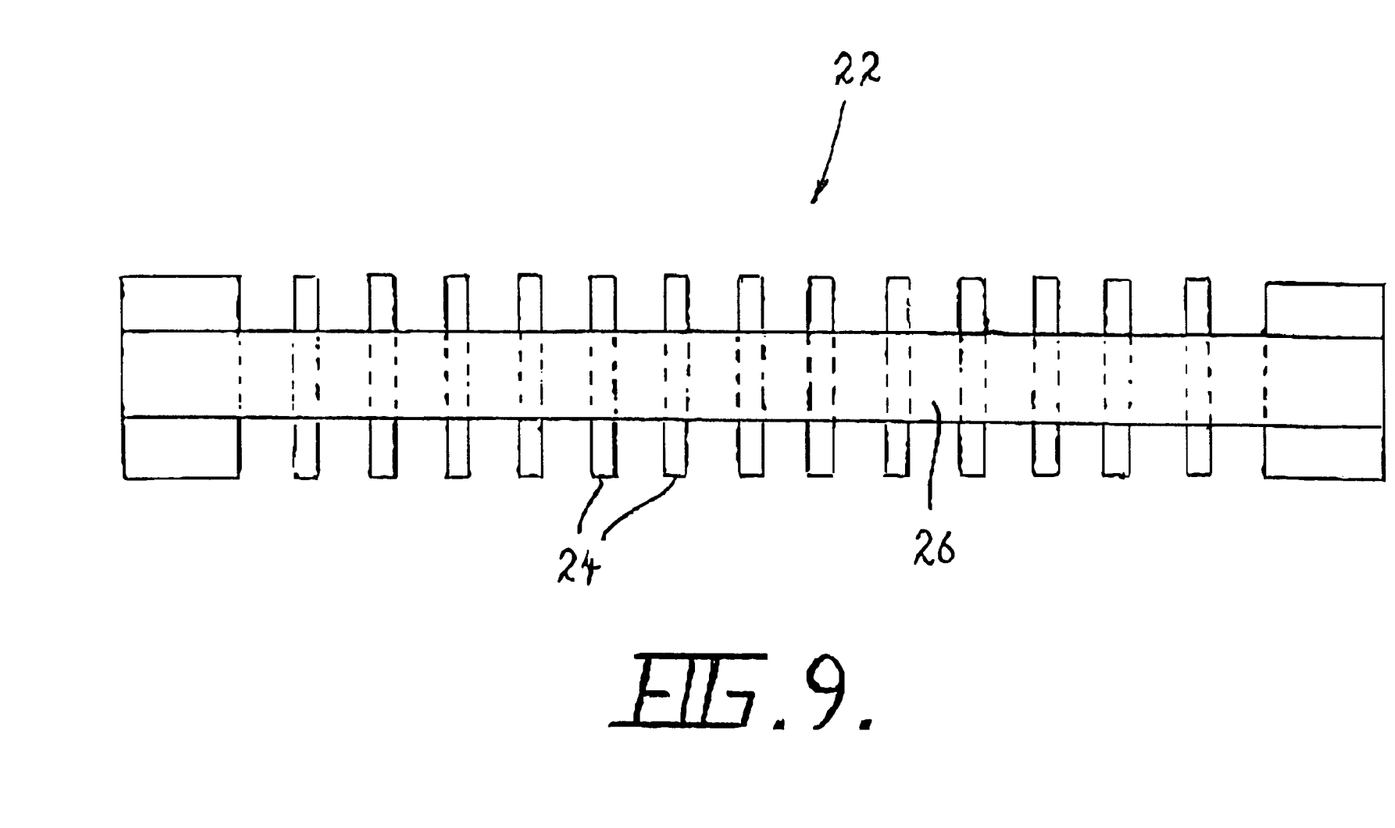
FIG. 9 illustrates in top view the hose bending clamp of FIG. 8.
Figure 11:
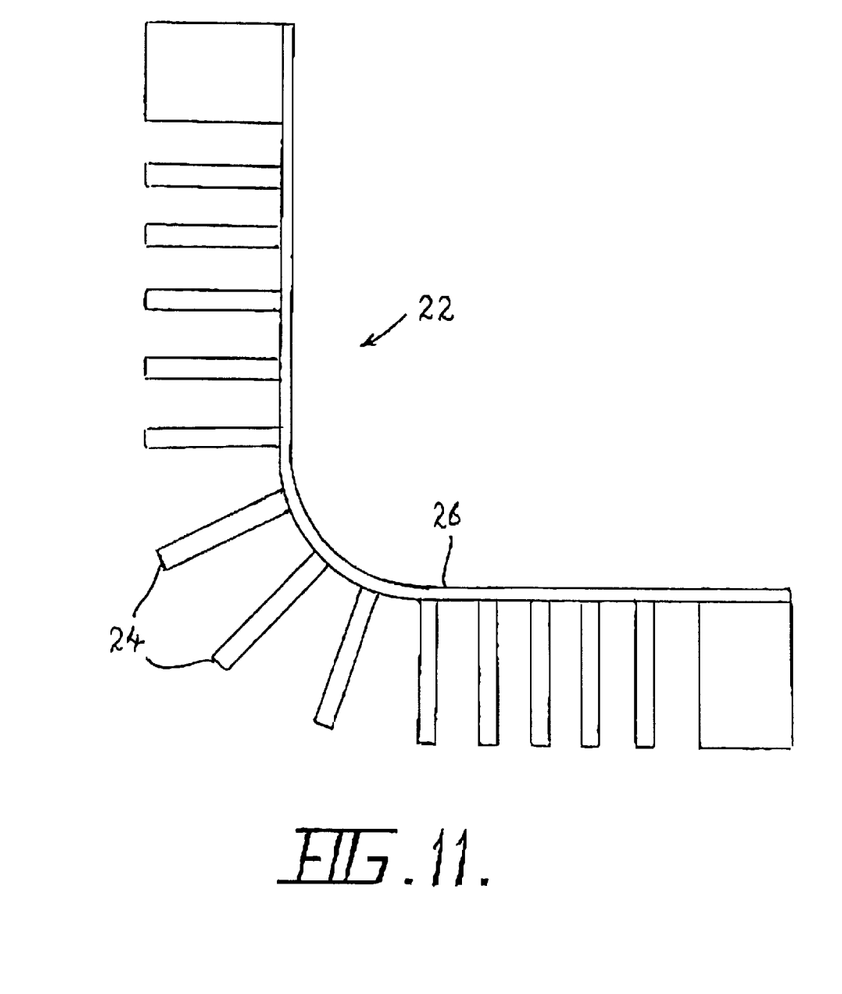
FIG. 11 illustrates the hose bending clamp of FIG. 8 bent into a desired shape.
Figures 12, 13, 14, 15:
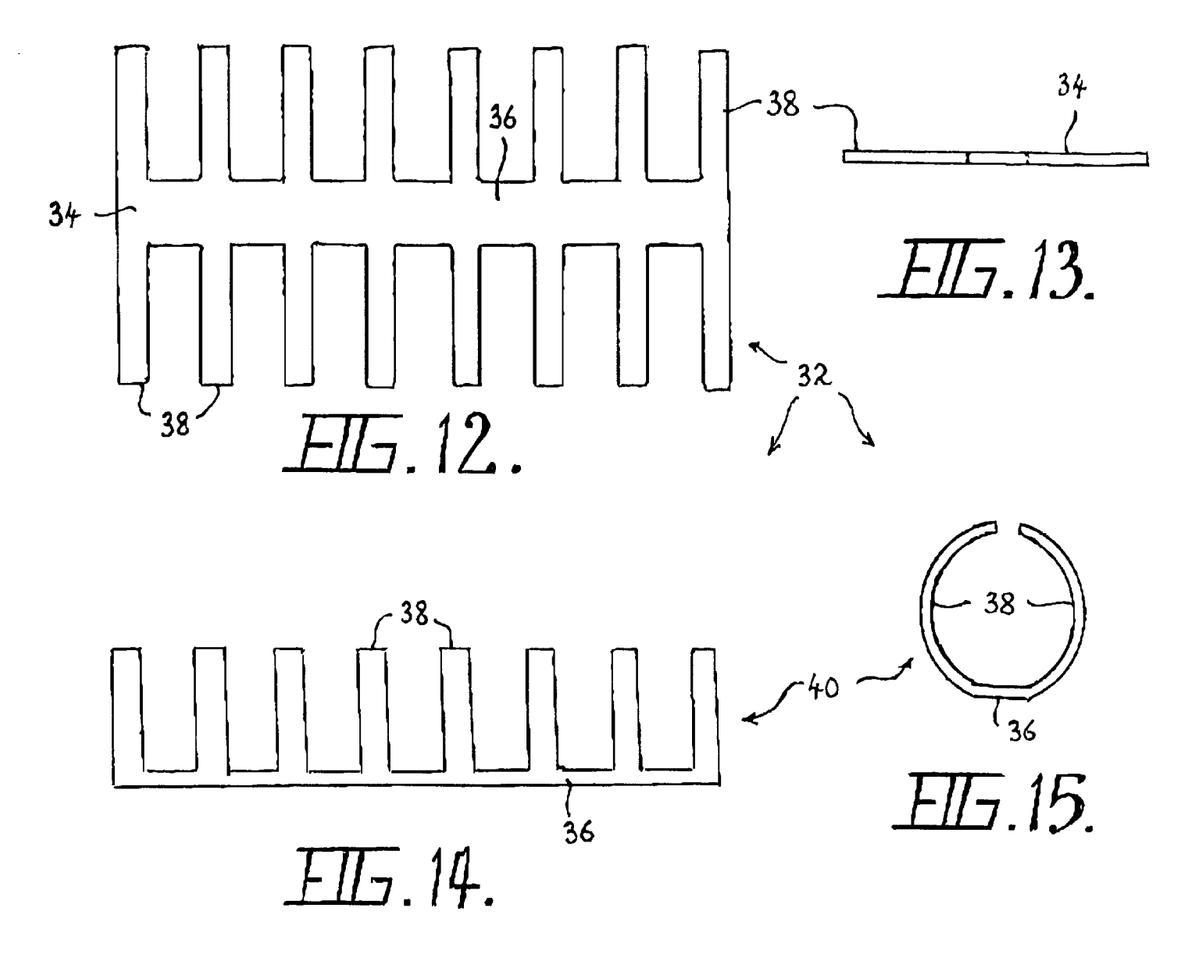
FIG. 12 illustrates in plan view a third embodiment of a hose bending clamp in accordance with the present invention in a pre-assembled condition.
FIG. 13 illustrates in end view the hose bending clamp of FIG. 12.
FIG. 14 illustrates in side view the hose bending clamp of FIG. 12.
FIG. 15 illustrates in end view the hose bending clamp of FIG. 14.

FIGS. 8 to 11 illustrate a second embodiment of the hose bending clamp 22 according to the present invention. In this embodiment, a plurality of substantially circular constraining means are formed by a plurality of separate circular ribs 24 positioned at spaced intervals along a spine 26 to form a generally cylindrical arrangement as shown in FIGS. 8 and 10. In this embodiment, the spine 26 is similar to the spine 16 of the first embodiment, and is formed from a rectangular strip of malleable metal. Each of the circular ribs 24 is formed from a metal ring that is fixed, for example by welding, to the spine 26 at spaced intervals along the length of the spine. In the illustrated embodiment, two end rings 30 of increased width are provided at each end of the spine 26 to form end sections of the clamp 22. As with the previous embodiment, the internal diameter of the circular ribs 24 and cylindrical arrangement 28 is slightly larger than the outside diameter of the hose for which it is designed. As with the previous embodiment, the purpose of the circular ribs 24 is to embrace the hose and substantially prevent it from spreading or kinking as it is bent into the desired shape. Clearly, a variety of clamps may be provided with a range of internal diameters sized to suit various outside diameters of hoses.

Each of the circular ribs 24 may also be formed integral with the spine 26 of the hose bending clamp 22. For example, the hose bending clamp 22 may be formed by cutting a series of parallel slots at spaced intervals along the length of the tube to achieve the same effect. Any suitable material may be used for manufacturing the hose bending clamp 22. For example, the clamp may be manufactured from a suitable plastics material, optionally having a metal rod embedded or otherwise fixed to the spine to provide the required strength and malleability.

FIGS. 12 to 15 illustrate a third embodiment of the hose bending clamp 32 according to the present invention. In this embodiment, the hose bending clamp 32 is formed from a single piece of metal 34 stamped from a flat sheet. As can be seen most clearly in FIG. 12, the piece 34 of sheet metal is cut with a spine 36 having a plurality of parallel ribs 38 positioned at spaced intervals and extending transversely on either side of the spine 36. The piece 34 is stamped from a suitable malleable and resilient sheet metal. The piece 34 is then rolled parallel to its longitude axis into a cylindrical shape as can be seen most clearly in FIGS. 14 and 15. Each of the ribs 38 is now bent into a circular shape to form a general cylindrical arrangement 40 similar to that of the previous embodiments.

As with the previous embodiment, the internal diameter of the ribs 38 and cylindrical arrangement 40 is slightly larger than the outside diameter of the hose for which it is designed. The purpose of the ribs 38 is to embrace the hose and substantially prevent it from spreading or kinking as it is bent into the desired shape. One advantage of this embodiment is that the hole hose bending clamp 32 can be formed from a single piece of metal that only requires a simple cutting and forming step to produce the finished article. A possible disadvantage, is that the ribs 38 may not be sufficiently resilient to prevent the hose from spreading or kinking, particularly with heavy duty thick-walled hoses.

From the above description of preferred embodiments of the hose bending clamp, it will be apparent that it provides a number of advantages, including the following:

(a) it enables a standard hose to be sold in straight lengths at lower cost for multiple applications without requiring special forming or other shaping treatments;

(b) it is simple to use and can easily be bent into shape manually without requiring special tools or training;

(c) it is of simple design and can be manufactured at low cost; and (d) it is light-weight and has a low profile, and therefore does not interfere with other components or occupy valuable space within a confined space such as a motor vehicle engine compartment.

Numerous variations and modifications may suggest themselves to persons skilled in the mechanical arts, in addition to those already described, without departing from the basic inventive concepts. For example, the entire unit could be covered with a soft, flexible jacket made of plastics material to improve its asthetic appearance and/or to provide electrical insulation. All such modifications and variations are to be considered within the scope of the present invention, the nature of which is to be determined from the foregoing description and the appended claims.

What is claimed is:

1. A hose bending clamp for holding a hose in a desired bent shape, the clamp comprising:

a plurality of substantially circular constraining means configured to form an elongate generally cylindrical arrangement adapted to slide over the outside of a section of hose to be bent; and a malleable, elongate spine connected to said constraining means and extending longitudinally of said cylindrical arrangement, wherein said spine can be bent into a shape desired for the section of hose and will hold said shape when released whereby, in use, as the spine is bent with the section of hose contained within said cylindrical arrangement, each of said constraining means embrace the hose and substantially prevent the hose from spreading or kinking as it is forced into the desired shape.

2. A hose bending clamp as defined in claim 1, wherein said plurality of substantially circular constraining means are formed by a wire shaped into a coil.

3. A hose bending clamp as defined in claim 2, wherein said coil is formed with a plurality of turns in close proximity at each end to form respective end sections of said cylindrical arrangement.

4. A hose bending clamp as defined in claim 3, wherein each end section is formed with a ridge adapted to receive the respective ends of said spine in connection therewith.

5. A hose bending clamp as defined in claim 4, wherein said spine is formed from a rectangular strip of metal, each end of the rectangular strip being received under the ridge of said respective end section and bent back over the ridge so as to be joined to each end of the coil to form a unit.

6. A hose bending clamp as defined in claim 1, wherein said plurality of substantially circular constraining means are formed by a plurality of separate circular ribs positioned at spaced intervals along said spine to form said generally cylindrical arrangement.

7. A hose bending clamp as defined in claim 6, wherein each of said circular ribs are fixed to said spine at said spaced intervals.

8. A hose bending clamp as defined in claim 6, wherein each of said circular ribs is formed integral with said spine.

9. A hose bending clamp as defined in claim 1, wherein an inside diameter of said circular constraining means is slightly larger than an outside diameter of the section of hose to be bent.

10. A hose bending clamp for holding a hose in a desired bent shape, the clamp comprising:

a coil configured to form an elongate generally cylindrical arrangement adapted to slide over the outside of a section of hose to be bent; and a malleable, elongate spine connected to the coil adjacent longitudinal ends of the coil only and extending longitudinally of the coil, wherein said spine can be bent into a shape desired for the section of hose and will hold said shape when released whereby, in use, as the spine is bent with the section of hose contained within said cylindrical arrangement, each turn of said coil embraces the hose and substantially prevents the hose from spreading or kinking as it is forced into the desired shape.

11. A hose bending clamp as claimed in claim 10, wherein said spine is substantially rectangular shaped.

* * * * *